United States Patent [19]
Braxton et al.

[11] Patent Number: 5,771,576
[45] Date of Patent: Jun. 30, 1998

[54] STRAIN RELIEF DEVICE AND METHOD

[76] Inventors: Thomas R. Braxton, 11211 S. Military Trail, Boynton Beach, Fla. 33436; Gregg M. Connary, 8389 Elaine Dr., Boynton Beach, Fla. 33437

[21] Appl. No.: 862,050

[22] Filed: May 22, 1997

[51] Int. Cl.$^6$ .................................................. H01R 43/01
[52] U.S. Cl. ...................... 29/868; 174/65 R; 174/65 SS; 174/135; 29/825
[58] Field of Search ............................ 174/17 CT, 65 R, 174/65 SS, 135, 151, 152 R, 152 G, 153 G, 74 R, 65 G; 439/456, 457, 458, 459, 460; 385/134, 137, 138; 29/868, 872, 825; 248/56

[56] References Cited

U.S. PATENT DOCUMENTS

| | | | |
|---|---|---|---|
| 4,150,250 | 4/1979 | Lundeberg | 174/65 SS |
| 4,341,922 | 7/1982 | Bossard et al. | 174/92 |
| 4,369,944 | 1/1983 | Hobart, Jr. | 248/56 |
| 4,845,316 | 7/1989 | Kaercher | 174/135 |
| 4,857,674 | 8/1989 | Filbert | 174/135 |
| 5,304,742 | 4/1994 | Filbert | 174/135 |
| 5,481,939 | 1/1996 | Bernardini | 74/502.4 |

*Primary Examiner*—Kristine L. Kincaid
*Assistant Examiner*—Dhiru R. Patel
*Attorney, Agent, or Firm*—John H. Moore

[57] ABSTRACT

A strain relief device (10) for wires is formed of a nonconductive plate (12) having a central axis (18) and a plurality of through-holes (14) distributed around the central axis (18). Each through-hole has a diameter selected to permit a wire to pass through it without binding. The non-conductive plate (12) includes a plurality of shoulders (20), one shoulder associated with each through-hole (14) and located between its associated through-hole and the outer perimeter of the plate (12). A preferred method of using the strain relief device is also described.

6 Claims, 3 Drawing Sheets

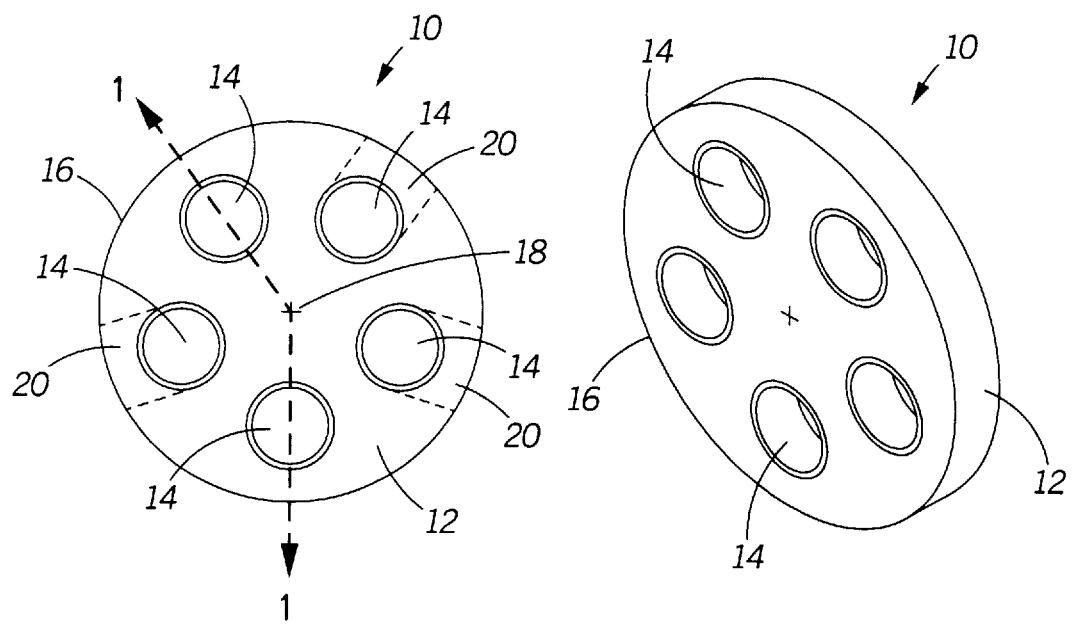
*FIG.1*    *FIG.2*
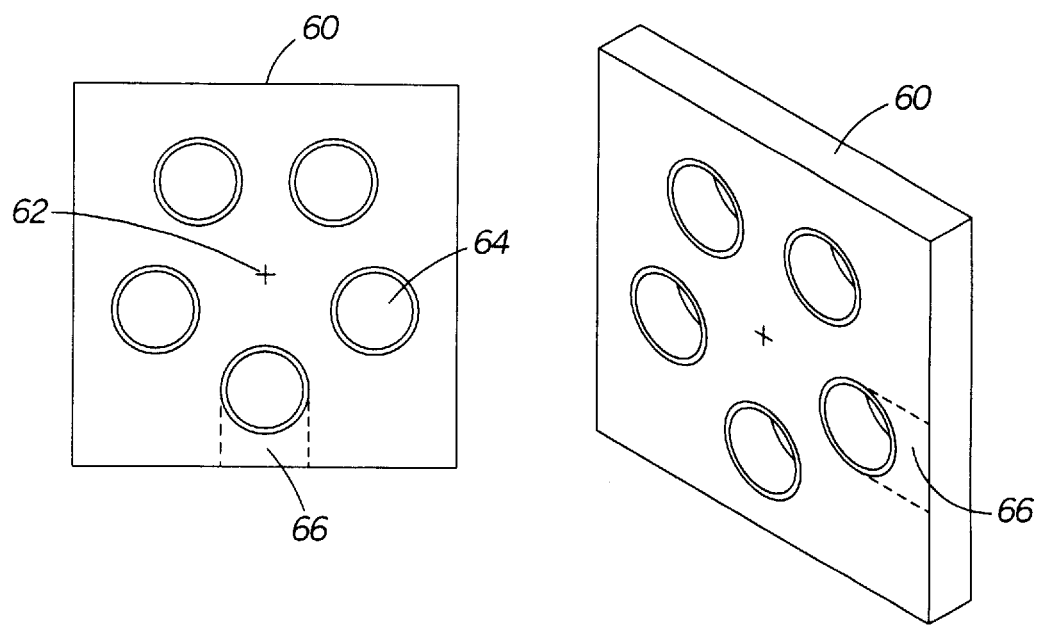
*FIG.5*    *FIG.6*

STRAIN RELIEF DEVICE AND METHOD

FIELD OF THE INVENTION

This invention is directed to strain relief devices for wires that carry electric current.

BACKGROUND OF THE INVENTION

Current-carrying wires that are connected between two points that are physically separated from each other frequently require some sort of strain relief. In an exemplary situation where the wires run between a connector at one end, and individual terminals at an opposite end, a form of strain relief is needed to prevent force applied to the connector from pulling the wires away from their terminals.

A conventional technique that can provide strain relief uses a rubber device that is bonded to the wires and also fixed to a housing or the like to hold the wires in a fixed position relative to the housing. Although such a rubber device does provide strain relief, it is relatively expensive for some applications.

Other conventional devices also provide suitable strain relief, but their assembly can be difficult and/or require special tools. What is needed is a form of strain relief that is relatively inexpensive and also easy to install.

BRIEF DESCRIPTION OF THE FIGURES

FIG. 1 illustrates a strain relief device according to the invention;

FIG. 2 is a perspective view of the strain relief device shown in FIG. 1;

FIG. 5 illustrates an alternate strain relief device according to the invention; and FIG. 6 is a perspective view of the strain relief device shown in FIG. 5.

DESCRIPTION OF THE PREFERRED EMBODIMENT

Figure 3:
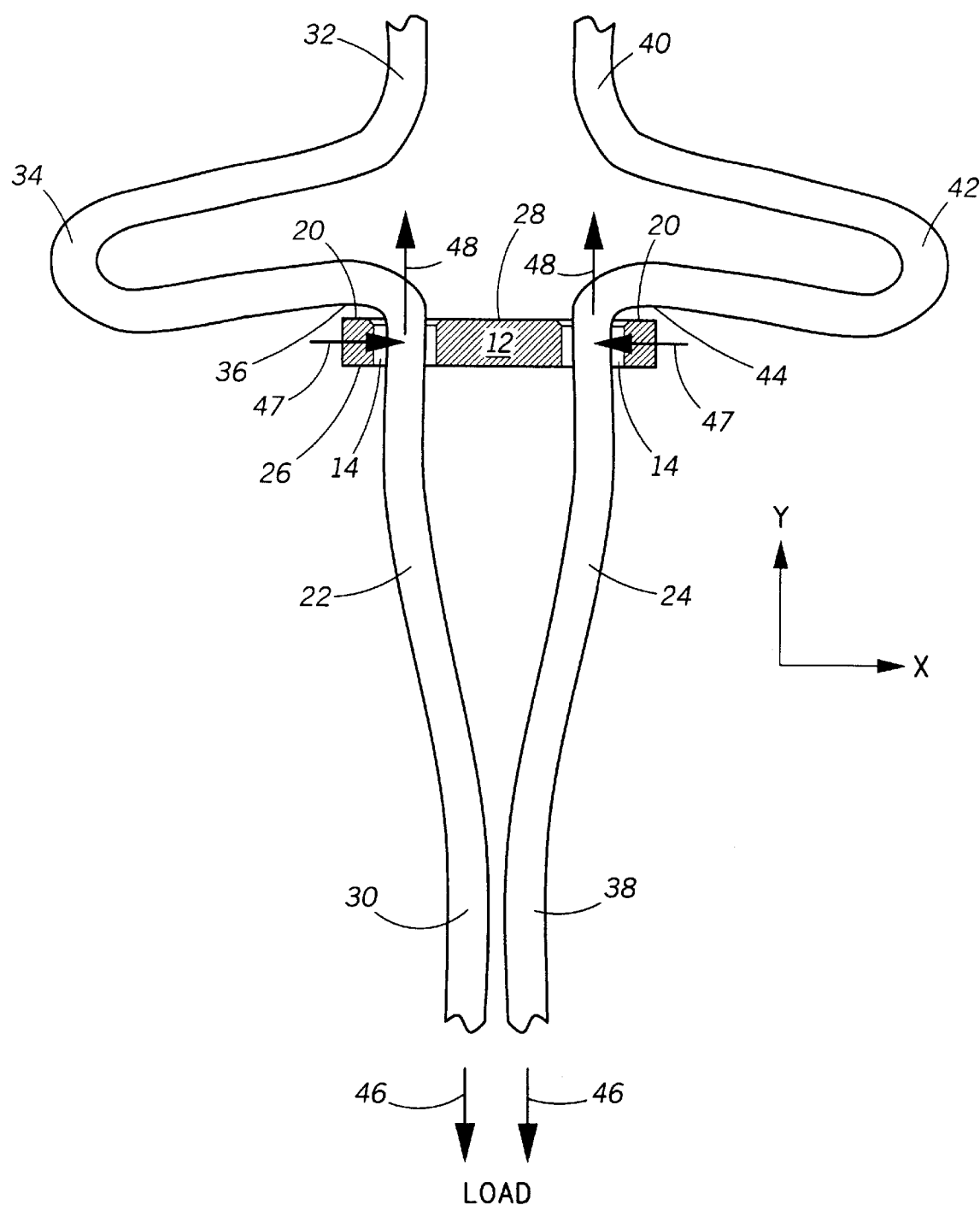
FIG. 3 is a sectional view of the strain relief device taken along section lines 1—1 of FIG. 1, including a pair of wires being used with the strain relief device to illustrate how tensile forces on the wires produce reactive forces exerted by the strain relief device.

Referring to FIGS. 1 and 2, the illustrated strain relief device 10 is in the form of a non-conductive plate 12 having a plurality of through-holes 14. One through-hole 14 is provided for each wire that is to be handled by the strain relief device 10. The diameter of each through-hole 14 is selected to permit a wire to pass through it without binding.

In the preferred embodiment, the non-conductive plate 12 is shaped as a disc that has a circular outer perimeter 16 and a central axis 18. The through-holes 14 are preferably distributed substantially uniformly around the central axis 18. In the illustrated embodiment, the through-holes 14 are separated from the central axis 18 by substantially equal radial distances, and each through-hole is separated from its two adjacent through-holes by substantially equal angular distances. In FIGS. 1 and 2, there are five through-holes 14 for handling five wires, with the center point of each through-hole being separated by 72 degrees from adjacent through-holes.

The disc-shaped plate 12 also includes areas that are referred to herein as "shoulders". These shoulders are an integral part of the plate 12 and are located between the through-holes 14 and the outer perimeter 16. In FIG. 1, three areas of the plate 12 are identified as shoulders 20. Each shoulder 20 is associated with one through-hole, and each is located between the outer perimeter 16 and its associated through-hole. The angular extent of each shoulder 20 is generally identified by the dashed lines. While only three of the shoulders 20 are shown with dashed lines in FIG. 1, it will be understood that each through-hole has its own associated shoulder located between the through-hole and the outer perimeter 16.

The function of a shoulder 20 is to act as a bearing surface for a wire that passes through the shoulder's associated through-hole. This function, and the present method of providing strain relief for a plurality of wires, will now be explained with reference to FIG. 3.

In accordance with this method, a non-conductive plate (such as the illustrated disc-shaped plate 12) is provided. The provided plate has a central axis, an outer perimeter and a plurality of through-holes with associated shoulders, all as described previously with reference to FIGS. 1 and 2. In FIG. 3, only two wires 22 and 24 are shown as being handled by the illustrated strain relief device in order to illustrate its operation. It will be understood, however, that the present strain relief device preferably handles at least three wires.

The plate 12 has a first side 26 and a second, opposite side 28. Strain relief is provided by threading the wire 22 through a through-hole 14 such that a load portion 30 of the wire 22 extends beyond the first side 26, and an opposite portion 32 of the same wire extends beyond the plate's second side 28. The load portion of a wire is a portion that may receive a tensile load during installation, as while being fitted to a connector.

The portion 32 of the wire 22 is bent, preferably to form a loop 34, and to provide a load-resisting portion 36 that extends toward and beyond the outer perimeter 16 of the plate 12, and is adjacent to an underlying shoulder 20. Portion 32 of the wire 22 is typically connected to electrical apparatus (not shown in FIG. 5).

The other wire 24 is threaded through a through-hole 14 in the same manner as described for the other wire 22. A load portion 38 of wire 24 extends beyond the plate's side 26, and an opposite portion 40 is bent to form a loop 42 and to provide a load resisting portion 44 which is adjacent to an underlying shoulder 20.

Arrows 46, 47 and 48 indicate X and Y components of forces applied to the wires 22, 24. When a load (force) is applied to the wires in the direction of arrows 46, the resultant tensile loading on the wires induces forces that, if unconstrained, would unbend the loops 34 and 42. However, the load resisting portions 36 and 44 of wires 22 and 24 bear against their underlying shoulders 20, and the plate 12 exerts reaction forces whose X and Y components are shown by arrows 47 and 48. These forces maintain static equilibrium so that loops 34 and 42 are maintained, and the plate 12 is not substantially moved in the direction of arrows 46.

It is preferred that the wires load portions 30, 38 do not exit the through-holes 14 in a straight line, i.e., do not extend straight downwardly in FIG. 3. Rather, the wires preferably are directed radially inwardly toward the center of the plate 12, as shown in FIG. 3, or radially outwardly from the center of the plate 12. This orientation of the wires helps develop the reaction forces that maintain the static equilibrium discussed above.

Figure 4:
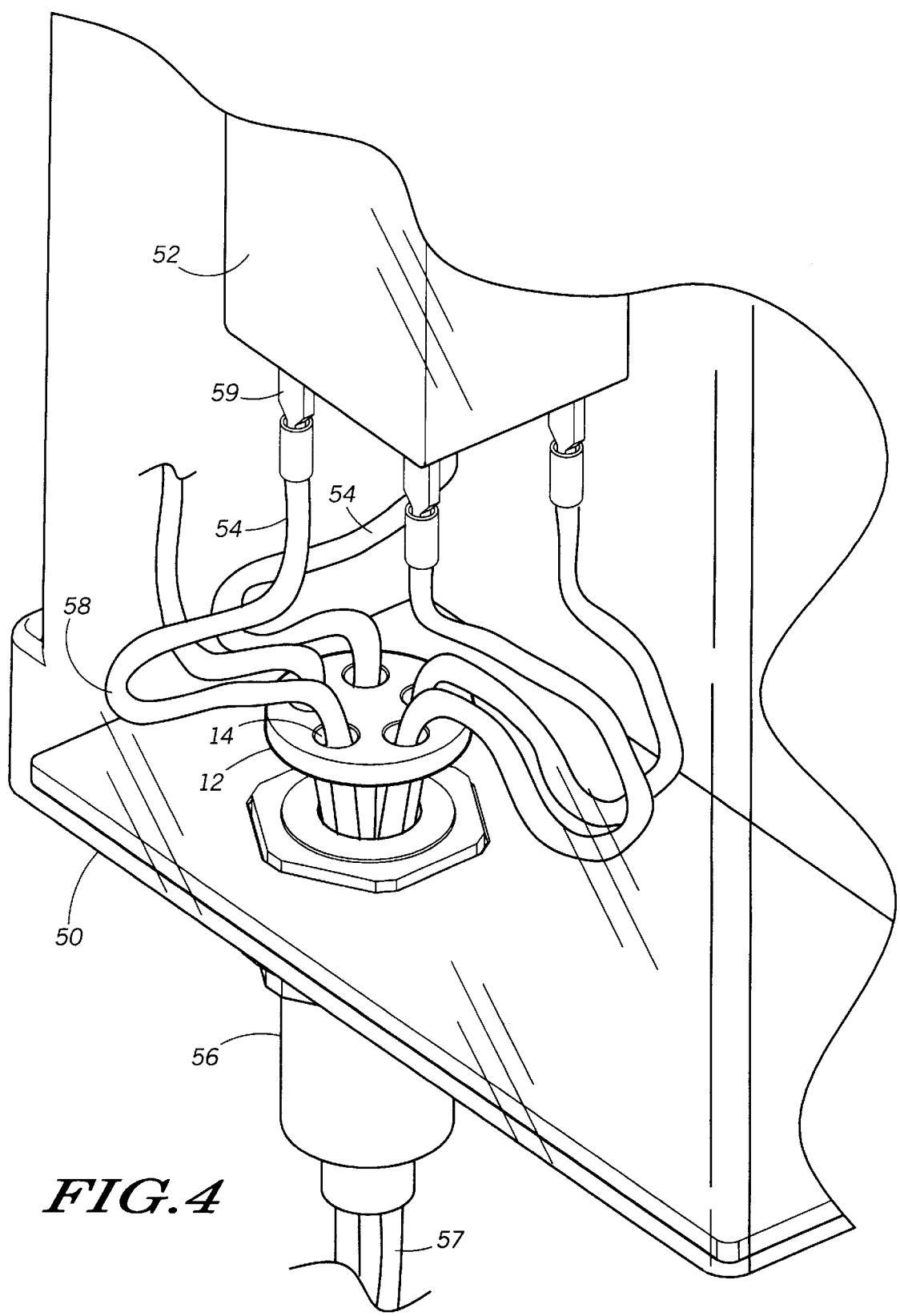
FIG. 4 shows how the device of FIGS. 1 and 2 is used to relieve strain on a bundle of wires.

Referring now to FIG. 4, there is shown a typical application of the strain relief device . A transparent housing 50 contains an electrical apparatus 52. The electrical input/output ports of apparatus 52 are coupled outside the housing 50 via wires 54 which couple to a connector 56. Additional wires 57 continue the connection to a remote location.

In this application, the plate 12 is in the form of a disc having five through-holes 14 through which wires 54 are threaded. Each wire extends above the plate 12 where it is bent to form a loop 58, and terminates in an end that carries an electrical terminal 59 which connects to a mating terminal (not shown) on electrical apparatus 52.

Tensile force applied to the wires 54 from below the plate 12 does not move the plate 12 or unbend the loops 58. Accordingly, the portions of the wires 54 that extend between the plate 12 and the electrical apparatus 52 are free of strain. This is accomplished at a relatively low cost using the plate 12 as described above. No special tools are required to use the plate 12, and installation is relatively quick and inexpensive.

The plate 12 may be made of polycarbonate that is injection molded to form the desired geometry and number of through-holes. Other manufacturing techniques such as stamping may also be used.

In a test using a disc-shaped plate handling five 10 gauge wires, a 25 pound tensile force was applied to the load portion of each wire, one wire at a time, for 60 seconds each. The result was minimal longitudinal movement of the plate and wires, with substantially no unbending of the loops in the wires.

Although the strain relief device is preferably in the form of a disc (which minimizes the amount of material needed) it may take other forms as well. For example, FIGS. 5 and 6 show a strain relief device in the form of a rectangular plate 60. It has a central axis 62 surrounded by uniformly spaced through-holes 64, with each through-hole having an associated shoulder 66.

Although the invention has been described in terms of specific embodiments, it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A method for providing strain relief for a plurality of wires, comprising:
   providing a single non-conductive plate having a first side, a second side, an outer perimeter, a central axis and a plurality of through-holes distributed around the central axis;
   threading each one of said wires through one of the through-holes such that a load portion of each of said wires extends beyond the first side of the non-conductive plate and an opposite portion of each of said wires extends beyond the second side of the nonconductive plate; and
   bending the opposite portion of each of said wires so as to provide a load-resisting portion that extends toward and beyond the outer perimeter of the non-conductive plate,
   whereby a load applied to said load portion of one of the wires is transferred to the single non-conductive plate.

2. A method as set forth in claim 1 wherein each of said wires is bent so as to form a loop.

3. A method as set forth in claim 1 wherein the opposite portion of each of said wires terminates in an end, and including the step of connecting the end of each of said wires to an electrical apparatus.

4. A method as set forth in claim 1 wherein the non-conductive plate includes a plurality of shoulders, each of said shoulders associated with one of said through-holes each of said shoulders being located between the outer perimeter and the associated one of said through-holes and being sized to provide a bearing surface for the load-resisting portion of each of said wires that extends through the shoulder's associated through-hole.

5. A method as set forth in claim 1 wherein the non-conductive plate is shaped as a disc, and wherein the through-holes are distributed substantially uniformly around the central axis.

6. A method as set forth in claim 4 wherein the through-holes are distributed at substantially equal radial distances from the central axis, and at substantially equal angular distances from each other.

* * * * *